US012196088B2

(12) United States Patent
Schmidt-Petersen et al.

(10) Patent No.: US 12,196,088 B2
(45) Date of Patent: Jan. 14, 2025

(54) ADJUSTMENT LEVER FOR A TURBOMACHINE

(71) Applicant: MTU Aero Engines AG, Munich (DE)

(72) Inventors: Julia Schmidt-Petersen, Munich (DE); Franz-Josef Ertl, Munich (DE); Florian Neuberger, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 18/052,942

(22) Filed: Nov. 7, 2022

(65) Prior Publication Data

US 2023/0145371 A1 May 11, 2023

(30) Foreign Application Priority Data

Nov. 8, 2021 (DE) ......................... 102021128979.3

(51) Int. Cl.
*F01D 17/14* (2006.01)
*F01D 17/12* (2006.01)
*F01D 17/16* (2006.01)

(52) U.S. Cl.
CPC ............. *F01D 17/14* (2013.01); *F01D 17/12* (2013.01); *F01D 17/16* (2013.01); *F01D 17/162* (2013.01); *F05D 2220/323* (2013.01); *F05D 2230/31* (2013.01); *F05D 2240/12* (2013.01)

(58) Field of Classification Search
CPC .......... F01D 17/14; F01D 17/12; F01D 17/16; F01D 17/162; F05D 2220/323; F05D 2240/12; F05D 2250/90; F05D 2260/50
See application file for complete search history.

(56) References Cited

U.S. PATENT DOCUMENTS 1,585,862 A * 5/1926 Jessop ..................... F03B 3/183 415/164
8,714,916 B2 * 5/2014 Jarrett, Jr. ............. F04D 29/563 415/160
10,385,721 B2 * 8/2019 Dumas .................. F01D 17/162
(Continued)

FOREIGN PATENT DOCUMENTS

DE 102008019156 A1 * 10/2009 ........... F01D 25/162
DE 102015004649 A1 10/2016
(Continued)

OTHER PUBLICATIONS

Laser Powder Bed Fusion Using Diode Lasers YouTube Jul. 31, 2020; (Screen Shot Provided) https://youtu.be/Wrxef_4DL_g?si=iQ9-aTDmOr-VM3us (Year: 2020).*
(Continued)

*Primary Examiner* — Brian Christopher Delrue
(74) *Attorney, Agent, or Firm* — LEYDIG, VOIT & MAYER, LTD.

(57) ABSTRACT

An adjustment lever adjusts a stator vane of a turbomachine. The adjustment lever has: a first connection site, of a plurality of connection sites, the first connection site being configured to join to an adjustment ring; a second connection site, of the connection sites, the second connection stie being configured to join to the stator vane; and a joining member arranged between the first connection site and the second connection site. The joining member is shaped having at least two struts which adjoin at least one of the connection sites.

14 Claims, 3 Drawing Sheets

(56) References Cited

U.S. PATENT DOCUMENTS

| | | | | |
|---|---|---|---|---|
| 2004/0240990 | A1* | 12/2004 | Rockley | F01D 17/162 415/148 |
| 2009/0074569 | A1* | 3/2009 | Garcin | F04D 29/563 415/148 |
| 2016/0356173 | A1* | 12/2016 | Longworth | F01D 17/162 |
| 2018/0119566 | A1 | 5/2018 | Leopold | |
| 2019/0136709 | A1* | 5/2019 | King | F01D 17/165 |
| 2020/0116042 | A1 | 4/2020 | Koletzki | |
| 2020/0149478 | A1 | 5/2020 | Fabre et al. | |
| 2022/0170381 | A1* | 6/2022 | Poick | F01D 9/041 |
| 2022/0372890 | A1* | 11/2022 | Bentley | F01D 9/042 |
| 2023/0147099 | A1* | 5/2023 | Ando | F04D 29/023 415/148 |

FOREIGN PATENT DOCUMENTS

| | | | | |
|---|---|---|---|---|
| DE | 102018217435 | A1 | 4/2020 | |
| FR | 3097007 | A1 | 12/2020 | |
| GB | 2539095 | A * | 12/2016 | F01D 17/162 |
| SU | 450896 | A1 | 11/1974 | |
| WO | WO 2013163011 | A1 | 10/2013 | |
| WO | WO-2023020655 | A1 * | 2/2023 | |

OTHER PUBLICATIONS

Joseph Capus, “2020 MPIF PM Design Excellence Competition Awards,” Metal Powder Report, Nov. 2021, pp. 350-355, vol. 75, No. 6, Elsevier, Amsterdam, Netherlands.

* cited by examiner

ADJUSTMENT LEVER FOR A TURBOMACHINE

CROSS REFERENCE TO RELATED APPLICATIONS

This application claims benefit to German Patent Application No. DE 102021128979.3 filed on Nov. 8, 2021 which is hereby incorporated by reference herein.

FIELD

The present disclosure relates to an adjustment lever for adjusting a stator vane of a turbomachine.

BACKGROUND

A turbomachine may, for example, be a jet engine, such as a turbofan engine. The turbomachine is functionally divided into a compressor, a combustor, and a turbine. In the case of the jet engine, for example, intake air is compressed by the compressor and then mixed and burned with jet fuel in the downstream combustor. The resulting hot gas—a mixture of combustion gas and air—flows through the downstream turbine and is expanded in the process. Both the compressor and the turbine are generally made up of a plurality of stages, each including a stator (stator vane ring) and a rotor (rotor blade ring).

Stator vane rings having adjustable stator vanes are used in compressors and turbines of turbomachines. The adjustment devices for the stator vanes may have different combinations of adjustment levers, joints, and adjustment rings that interact in order to turn each stator vane about its axis of rotation. For this purpose, a ring of adjustable stator vanes may typically be equipped with an adjustment ring which, when turned, causes a particular stator vane to turn simultaneously by way of the adjustment lever interposed in each case.

SUMMARY

In an embodiment, the present disclosure provides an adjustment lever adjusts a stator vane of a turbomachine. The adjustment lever has: a first connection site, of a plurality of connection sites, the first connection site being configured to join to an adjustment ring; a second connection site, of the connection sites, the second connection stie being configured to join to the stator vane; and a joining member arranged between the first connection site and the second connection site. The joining member is shaped having at least two struts which adjoin at least one of the connection sites.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
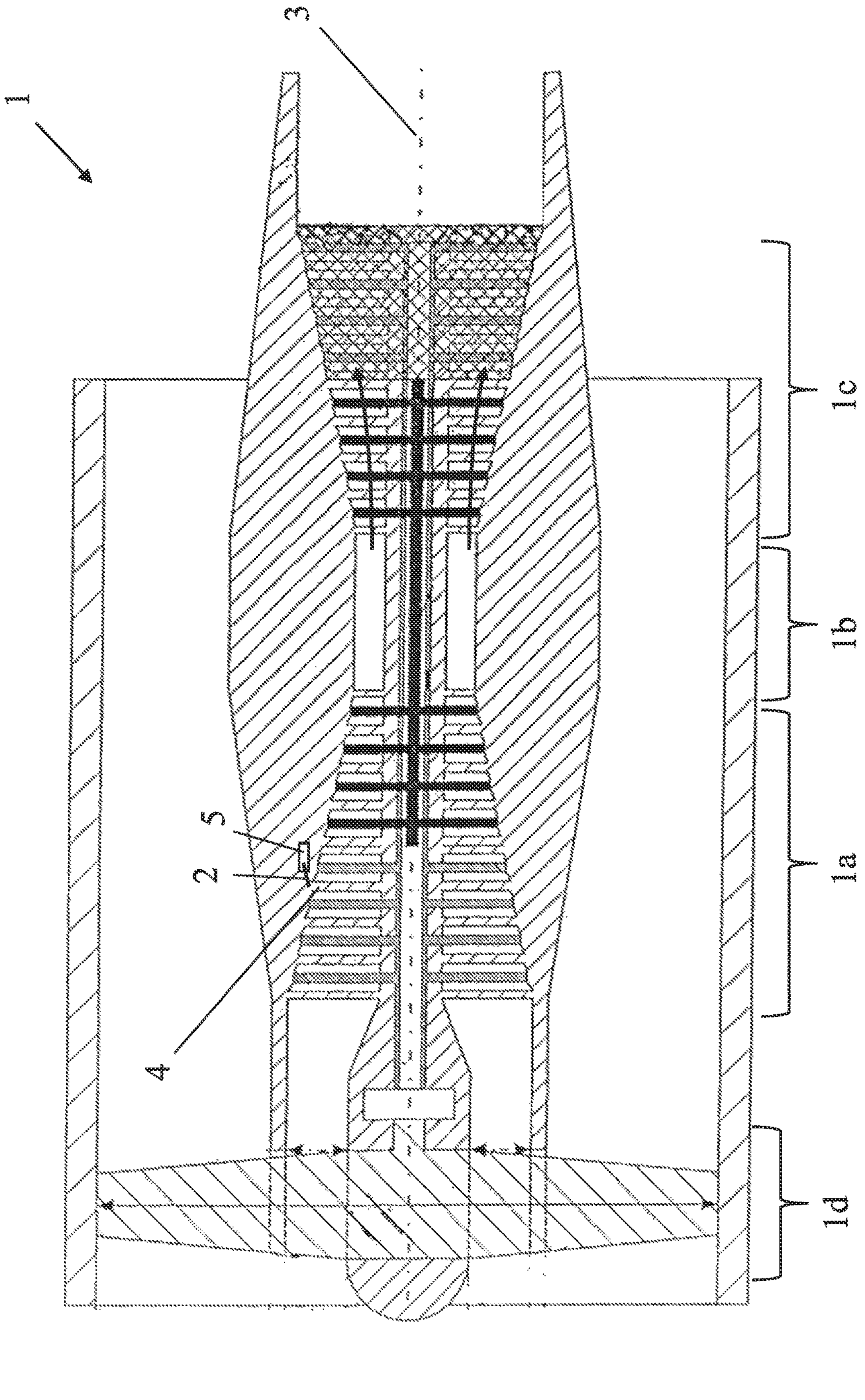
FIG. 1 is an axial cross-section of a turbomachine.

Aspects of the present disclosure provide an advantageous adjustment lever for a turbomachine.

According to an aspect of the present disclosure, an adjustment lever is provided that has connection sites and, therebetween, a joining member which, in the present case, is gripped by at least two struts. In use, the first connection site is joined to the adjustment ring and the second connection site is joined to the stator vane. When the adjustment ring moves in the circumferential direction, a torque can be transmitted to the second connection site by way of the adjustment lever, as a result of which the stator vane is turned through a particular angle about its axis of rotation. The at least two struts of the joining member extend into one of the connection sites and thus, for example, increase the rigidity in the transition between the joining member and the connection site; by way of example, this may be advantageous in terms of the torque or force transmission. By introducing a local material reinforcement in the form of the struts in a targeted manner at mechanically relevant sites, material can be saved in other regions of the adjustment lever, for example, so the adjustment lever can overall be built in a weight-optimized manner. In the case of the aircraft engine, for example, this may also help reduce fuel consumption.

Preferred embodiments are set out in the disclosure as a whole. In the description of the features, a distinction is not always drawn specifically between device, method, and use aspects. In any case, the disclosure should be read as implying all claim categories. Where reference is made to an adjustment lever manufactured in a particular way, for example, this should always also be read as disclosing a corresponding manufacturing method, and vice versa.

By way of example, each strut may be a thickened portion or a self-supporting structure. Each strut has an elongate shape along its center line; in other words, it is larger than when viewed in sectional planes perpendicular to the center line, for example (in each sectional plane, the center line is at the centroid). When viewed in the sectional planes, the cross-sectional shape of the strut may, for example, be round, approximately elliptical, or, for example, circular or a free-form shape; the strut may also take different cross-sectional shapes over its longitudinal extension. The at least two struts then adjoin at least one of the connection sites, i.e., the first or the second connection site or also both connection sites.

When in the form of a self-supporting structure, the strut may be separate from the rest of the joining member, i.e., not joined thereto, when viewed in the sectional planes. When in the form of a thickened portion, however, the strut may be joined to the joining member, i.e., may in each case merge monolithically into the rest of the joining member, when viewed in the sectional planes. In that case, a neighboring joining-member region that is thinner compared with the thickened portion may, for example, join the strut (thickened portion) to an adjacent strut (thickened portion); see below for more detail. Each strut may also adopt both forms over its longitudinal extension, i.e., may be configured to be self-supporting in one portion and as a thickened portion in a different portion.

As will be explicitly set out in detail below, the joining member may preferably also be shaped having a total of more than two struts, for example increasing in the order given, preferably at least 4, 6, 8, or 10 struts. Possible maxima that may be of interest regardless of the minima and should be disclosed may, for example, be at most 20, 18, 16, or 14 struts. Generally, although a machining manufacturing method is also conceivable, for example, the adjustment lever is preferably an additively manufactured component, regardless of the number of struts.

In general, the at least two struts each adjoin the at least one connection site in a transition region, where the strut thus ends and the connection site begins in each case. In a preferred configuration, the transition regions of the at least two struts are laterally offset from a center axis of the joining member; in other words, the struts do not extend into the connection site in the middle but rather to the side. This may be advantageous in terms of torque or force introduction, for example. The center axis of the joining member typically corresponds to the longitudinal axis thereof; by way of example, it passes through both the first and second connection sites in the middle (for example, in each case at an intersection of the axis of rotation of the connection site in question and a plane located in a side of the relevant connection site facing away from the adjustment ring or stator vane). By way of example, the center axis may also be an axis of symmetry about which the joining member is mirror-symmetrical.

In a preferred configuration, in addition to the at least two struts, a further strut adjoins the at least one connection site. Preferably, the number of adjoining struts increases in twos, for example by two or four struts (possible maxima may be, for example, a total of at most eight or even just six struts). Particularly preferably, four struts may be connected to the at least one connection site, for example, in particular to the first connection site (joint with the adjusting ring).

In a preferred configuration, in the transition region the at least two struts extend into the connection site in a direction that is tilted with respect to the center axis of the joining member by an amount of at least 10°. Specifically, this tilt is based on an angle between the center axis and a rectilinear elongation of the center line of the relevant strut, i.e., a tangent to the center line in the transition region of the relevant strut. If more than two struts adjoin the connection site, the struts closest to the center axis, i.e., the inner struts, may have less of a tilt than the outer struts, e.g., of 10°-30° compared with 40°-80°.

In a preferred embodiment, the at least two struts each have a convex form at least in some portions in relation to the center axis of the joining member. The struts are thus each domed away from the center axis, i.e., outward, at least in one portion of their longitudinal extension, preferably in opposite directions (one strut toward one side and the other strut toward the opposite side). Once again, this doming may, for example, be advantageous in terms of the introduction of force or torque.

In a preferred configuration, the joining member has a cross-connection which extends over its center axis, the cross-connection joining together at least two struts that are each laterally offset from the center axis. In addition, the cross-connection may also extend in a direction parallel to the center axis and additionally couple one or more struts that, for example, in turn extend in the direction of, or over, the center axis. By way of example, a total of four struts may be joined together by means of the cross-connection, at least two of the struts in each case being arranged between the cross-connection and the at least one connection site (the first and/or the second connection site).

In a preferred embodiment, a width of the joining member reaches a maximum value between the at least one connection site and the cross-connection, and specifically including the cross-connection (the maximum may thus also be located in the region of the cross-connection). In this case, the width is measured perpendicularly to the center axis of the joining member. Preferably, the at least one connection site may be the first connection site in this case.

According to a preferred configuration, the at least two struts each diverge from the center axis (they extend away therefrom) in the direction of the cross-connection at least in one portion at the at least one connection site. Preferably, they are arranged on different sides of the center axis, so the distance between the two struts increases in the direction of the cross-connection (at least in the portion at the at least one connection site). If more than two struts adjoin the at least one connection site (see the front), preferably at least the two inner struts diverge, i.e., those closest to the center axis.

In a preferred configuration, at least two struts, each adjoining the cross-connection, converge at least at the cross-connection or into it, in each case toward the center axis (they extend toward it). Therefore, in a preferred arrangement on different sides of the center axis, the distance between the two struts becomes smaller in the direction toward the cross-connection, for example. This may also be combined with the above-described divergence; for example, the at least two struts may thus diverge in one portion at the at least one connection site and converge in one portion at/in the cross-connection.

According to a preferred embodiment, when viewed in a sectional plane perpendicular to the center axis, the joining member has a spatial break between the at least two struts, i.e., they are configured to be self-supporting (see the front). This break extends over at least one portion along the center axis; in a different portion, therefore, the at least two struts may also be joined together. When the adjustment lever is viewed as a whole, the break may, for example, be a hole that extends through the joining member. Even though a weight reduction may already be achieved owing to a locally thinner design, this can be optimized further using one or more breaks.

In a preferred configuration, the "at least one connection site" referred to above, into which more than two struts extend, for example, is the first connection site joined to the adjustment ring. In general, however, the second connection site may be configured to have the same features, even though in the embodiment example only two—not four—struts extend into the second connection site, for example. The specific configuration may, for example, also reflect the general geometric conditions, i.e., how much space is available at each connection site.

The present disclosure also relates to a module for a turbine or preferably a compressor, the module having an adjustable stator vane, an adjustment ring, and an adjustment lever being disclosed in the present case. The adjustment lever joins the adjustment ring and the stator vane together such that, when the adjustment ring is displaced in the circumferential direction, a torque is transmitted by means of the adjustment lever to the stator vane, and the stator vane is adjusted. Preferably, a multiplicity, in particular all, of the stator vanes of the stator vane ring are coupled to the adjustment ring, particularly preferably using identical adjustment levers.

In a preferred configuration, the adjustment lever is manufactured in an additive manufacturing process, i.e., it is additively constructed. This is generally done on the basis of a data model of the adjustment lever by accordingly hardening regions of a previously amorphous or neutrally shaped material. Preferably, the additive construction is a powder bed process, in which the material is sequentially applied layer by layer in powder form and one region, predetermined on the basis of the data model of the adjustment lever, is selectively hardened per layer. The hardening is accomplished by fusion using a beam source, preferably a laser source, so the additive construction is selective laser melting (SLM). Preferably, the adjustment lever is produced in a construction direction from the second connection site toward the first connection site; this may be advantageous in terms of projections, etc., since the strut(s) adjoin the sites at an angle, for example.

The present disclosure also relates to the use of an adjustment lever being disclosed in the present case in a turbomachine, in particular in a jet engine. In the use, an adjustable stator vane is adjusted using the adjustment lever; in other words, using the adjustment lever an adjustment of the adjustment ring is converted into a rotation of the stator vane, thereby altering the angle of attack thereof.

Aspects of the present disclosure will now be described in more detail on the basis of example embodiments.

FIG. 1 is an axial cross-section of a turbomachine 1, specifically a turbofan engine. The turbomachine 1 is functionally divided into a compressor 1*a*, a combustor 1*b*, a turbine 1*c*, and a fan 1*d*. Both the compressor 1*a* and the turbine 1*c* are made up of a plurality of stages, each stage being composed of a stator vane ring and a rotor blade ring. The rotor blade rings rotate about the longitudinal axis 3 of the turbomachine 1 during operation. In the process, the intake air is compressed in the compressor 1*a*, and is then mixed and burned with jet fuel in the downstream combustor 1*b*. The hot gas is expanded in the turbine 1*c* and drives the rotor blade rings. By way of example, an adjustment lever 2 disclosed below may be arranged in the compressor portion 1*a* between an adjustment ring 5 and an adjustable stator vane 4.

Figure 2:
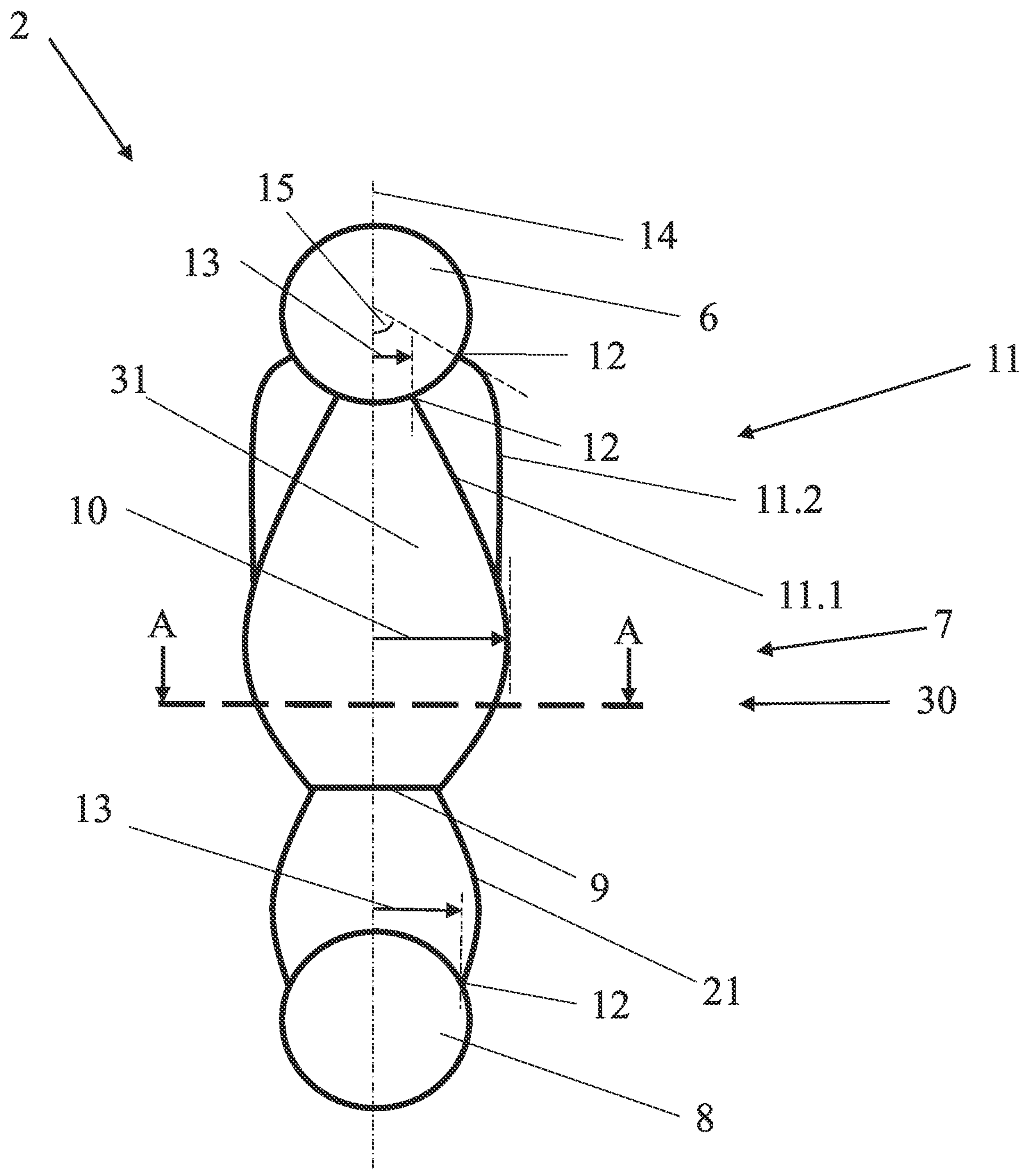
FIG. 2 is a schematic illustration of an adjustment lever according to an aspect of the present disclosure.

FIG. 2 is a schematic, mirror-symmetrical illustration of the adjustment lever 2 according to an aspect of the present disclosure. The adjustment lever 2 has a first connection site 6 for joining to the adjustment ring 5, a second connection site 8 for joining to the stator vane 4, and a joining member 7 arranged between the first 6 and the second 8 connection site. The connection sites 6, 8 each extend annularly around a hole (not shown here in more detail) that serves as a receptacle for a pin of the stator vane or of the adjustment ring 5.

The joining member 7 is shaped having a total of four first struts 11, specifically inner first struts 11.1 and outer first struts 11.2, which each adjoin the first connection site 6 in a transition region 12. In addition, the joining member also has two second struts 21, which each adjoin the second connection site 8 in a transition region 12. The transition regions 12 of the first connection site 6 and second connection site 8 are each laterally offset from a center axis 14 of the joining member 7, i.e., there is an offset 13 in each case.

The outer first struts 11.2 extend into the first connection site 6 at a tilt angle 15 of approximately 60° to the center axis 14. The inner first struts 11.1 also extend into the first connection site 6 with a tilt (of around 15°).

In addition, the joining member 7 has a cross-connection 9, which extends over the center axis 14 of the joining member 7. In the present case, the cross-connection 9 is shown schematically. In the actual component, it may also extend a certain amount toward the center axis 14, for example approximately as far as the highlighted sectional plane A-A.

The outer first struts 11.2 have a partly convex form in relation to the center axis 14 and merge into the inner first struts 11.1. Reference numeral 10 denotes a width of the joining member 7 measured perpendicularly to the center axis 14, the width reaching a maximum value between the first connection site 6 and the cross-connection 9. At the first connection site 6, the inner first struts 11.1 each diverge from the center axis 14 in the direction of the cross-connection 9. In an adjoining portion in which the inner first struts 11.1 adjoin the cross-connection 9, the struts each converge toward the center axis 14 in the direction of the cross-connection 9.

Figure 3:
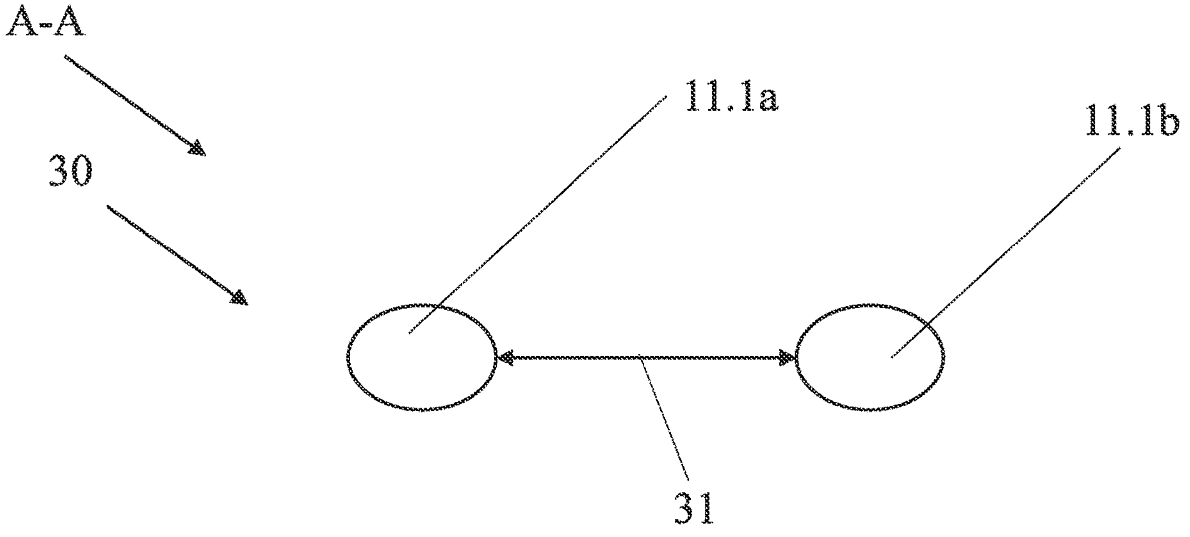
FIG. 3 shows an adjustment lever according to an aspect of the disclosure according to FIG. 2 in section A-A.

FIG. 3 shows the joining member 7 in section A-A perpendicularly to the center axis 14. The joining member 7 exhibits a spatial break 31 between the inner first struts 11.1*a* and 11.1*b*. In relation to FIG. 2, the break is located between the joining region 9 and the first connection site 6. In addition, breaks may also be provided between each inner and outer first strut 11.1, 11.2, for example; overall, the described design makes it possible to produce an adjustment lever that is lighter yet rigid.

Figure 4:
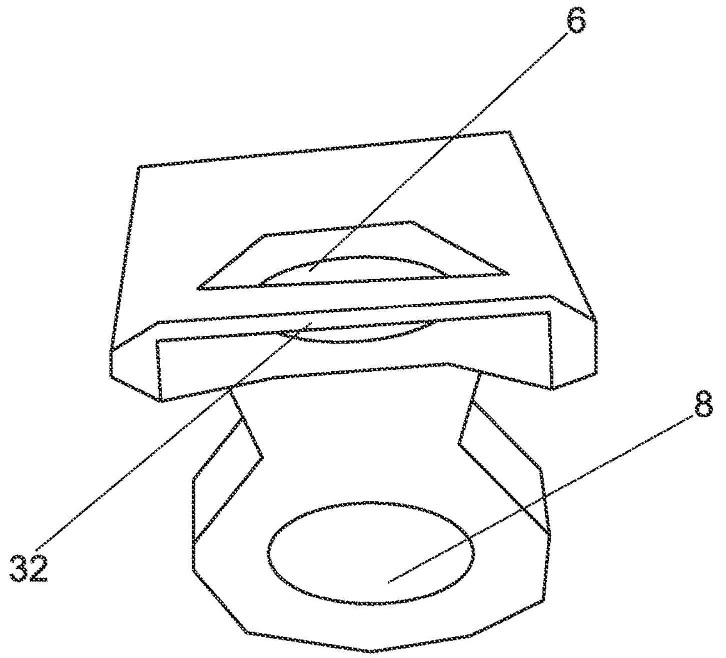
FIG. 4 shows a bionic design for a connection site.

FIG. 4 shows a bionic design for a connection site (6, 8). In general, the adjustment lever is joined to the vane by means of an interface of this kind. To increase the accuracy during the adjustment, the interface between the vane and the lever may be at an angle (saddle shape in FIG. 4 at an angle of around 45°). However, this angle simultaneously leads to deformation occurring during screwing (or during other fastening methods). The sides are "bent down" by the pressure from above. To counteract this effect, in the embodiment shown a rib 32 spans the gap between the two oblique legs of the connection site (6, 8) in the manner of a bridge.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Turbomachine 1
Compressor 1*a*

Combustor 1*b*
Turbine 1*c*
Fan 1*d*
Adjustment lever 2
Axis of rotation 3
Stator vane 4
Adjustment ring 5
First connection site 6
Joining member 7
Second connection site 8
Cross-connection 9
Width of the joining member 10
First struts 11
Inner first struts 11.1
Outer first struts 11.2
Second struts 21
Transition region 12
Lateral offset of the transition region 13
Center axis 14
Angle between center axis and strut run-in direction 15
Break between two struts 31

The invention claimed is:

1. An adjustment lever for adjusting a stator vane of a turbomachine, the adjustment lever comprising:
- a first connection site, of a plurality of connection sites, the first connection site being configured to join to an adjustment ring;
- a second connection site, of the plurality of connection sites, the second connection site being configured to join to the stator vane; and
- a joining member arranged between the first connection site and the second connection site,
- wherein the joining member comprises at least three struts, which each adjoin the first connection site or each adjoin the second connection site, and
- wherein two of the at least three struts each have an at least partly convex form in relation to a center axis of the joining member such that the two struts are respectively domed away from the center axis in at least one portion of a longitudinal extension thereof.

2. The adjustment lever according to claim 1, wherein the at least three struts each adjoin at least one of the connection sites in a transition region, the transition region being laterally offset from the center axis of the joining member.

3. The adjustment lever according to claim 2, wherein the at least three struts each adjoin the first connection site in the transition region.

4. The adjustment lever according to claim 1, wherein the at least three struts each extend into at least one of the connection sites in a direction that is tilted with respect to the center axis of the joining member by an amount of at least 10°.

5. The adjustment lever according to claim 1, wherein the joining member has a cross-connection that extends over the center axis of the joining member, the cross-connection joining the at least three struts that are each laterally offset from the center axis of the joining member.

6. The adjustment lever according to claim 5, wherein a width of the joining member, measured perpendicularly to the center axis of the joining member, reaches a maximum value between at least one of the connection sites up to and including the cross-connection.

7. The adjustment lever according to claim 5, wherein two of the at least three struts each diverge from the center axis in the direction of the cross-connection at least in one portion at at least one of the connection sites.

8. The adjustment lever according to claim 5, wherein the two of the at least two struts, which each adjoin the cross-connection, each converge toward the center axis in the direction of the cross-connection at least in one portion adjoining the cross-connection.

9. The adjustment lever according to claim 1, wherein the joining member has a break that separates at least two of the at least three struts from one another at least in some portions when viewed in a sectional plane perpendicular to the center axis of the joining member.

10. A compressor module or a turbine module having an adjustable stator vane, an adjustment ring, and the adjustment lever according to claim 1 that joins the stator vane to the adjustment ring.

11. A method for producing the adjustment lever according to claim 1, the method comprising additively constructing the adjustment lever.

12. The method according to claim 11, wherein the adjustment lever is manufactured in a construction direction from the second connection site toward the first connection site.

13. An adjustment lever for adjusting a stator vane of a turbomachine, the adjustment lever comprising:
- a first connection site, of a plurality of connection sites, the first connection site being configured to join to an adjustment ring;
- a second connection site, of the plurality of connection sites, the second connection site being configured to join to the stator vane; and
- a joining member arranged between the first connection site and the second connection site,
- wherein the joining member comprises four struts, which each adjoin the first connection site or each adjoin the second connection site,
- wherein the first connection site extends annularly around a first hole, and the second connection site extends annularly around a second hole, the first hole being configured to receive a first pin for connecting the adjustment lever to the stator vane, the second hole being configured to receive a second pin for connecting the adjustment lever to the adjustment ring,
- wherein the four struts comprise two inner struts and two outer struts,
- wherein the four struts each adjoin the first connection site in a first transition region where the four struts each end and the first connection site begins, the first connection site extending away from the joining member,
- wherein the two inner struts are mirror-symmetrically configured with respect to each other and with respect to a center axis of the joining member that extends through a center of the first connection site and the second connection site,
- wherein the two outer struts are mirror-symmetrically configured with respect to each other and with respect to the center axis, and
- wherein the two inner struts are closer to the center axis as compared to the two outer struts, and wherein the two inner struts have a lower tilt than the two outer struts, the respective tilt being based on an angle between the center axis and a rectilinear elongation of the center line of the respective one of the four struts.

14. The adjustment lever according to claim 13,
- wherein the joining member comprises two further struts each adjoining the second connection site at a second transition region where the two further struts end and the second connection site beings, the second connection site extending away from the joining member in a direction parallel to the center axis and away from the first connection site.

* * * * *